United States Patent
Sawada et al.

(10) Patent No.: US 9,148,615 B2
(45) Date of Patent: Sep. 29, 2015

(54) VIDEO DISPLAY DEVICE AND MULTI-SCREEN DISPLAY DEVICE

(71) Applicants: Kiyoshi Sawada, Tokyo (JP); Yoshinori Asamura, Tokyo (JP); Isao Yoneoka, Tokyo (JP)

(72) Inventors: Kiyoshi Sawada, Tokyo (JP); Yoshinori Asamura, Tokyo (JP); Isao Yoneoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 105 days.

(21) Appl. No.: 13/713,092

(22) Filed: Dec. 13, 2012

(65) Prior Publication Data
US 2013/0258190 A1    Oct. 3, 2013

(30) Foreign Application Priority Data
Apr. 2, 2012   (JP) ................................. 2012-083569

(51) Int. Cl.
  *G03B 21/20*   (2006.01)
  *H04N 5/74*    (2006.01)
  *H04N 9/31*    (2006.01)

(52) U.S. Cl.
  CPC ........... *H04N 5/7416* (2013.01); *H04N 9/3147* (2013.01); *H04N 9/3155* (2013.01); *G03B 21/206* (2013.01); *G03B 21/2033* (2013.01); *G03B 21/2053* (2013.01)

(58) Field of Classification Search
  CPC .. G03B 21/14; G03B 21/206; G03B 21/2033; H04N 9/3155; H04N 9/3197
  USPC ........ 353/30, 31, 69, 70, 85, 94, 99; 315/151, 315/152, 160, 161; 345/1.3, 102, 156
  See application file for complete search history.

(56) References Cited

U.S. PATENT DOCUMENTS

| | | | |
|---|---|---|---|
| 7,084,880 B2 * | 8/2006 | Kimura et al. | 345/589 |
| 8,004,545 B2 * | 8/2011 | Inuzuka et al. | 345/690 |
| 2005/0122481 A1 * | 6/2005 | Yamasaki et al. | 353/31 |
| 2006/0238723 A1 * | 10/2006 | El-Ghoroury | 353/94 |
| 2008/0284677 A1 * | 11/2008 | Whitehead et al. | 345/1.3 |
| 2009/0066634 A1 * | 3/2009 | Isobe et al. | 345/102 |
| 2010/0128226 A1 * | 5/2010 | Shibasaki | 353/31 |
| 2011/0181565 A1 | 7/2011 | Asamura et al. | |

FOREIGN PATENT DOCUMENTS

| | | |
|---|---|---|
| CN | 1619356 A | 5/2005 |
| CN | 101416227 A | 4/2009 |
| CN | 101427174 A | 5/2009 |
| CN | 102137245 A | 7/2011 |
| JP | 2005-274884 A | 10/2005 |

* cited by examiner

*Primary Examiner* — Sultan Chowdhury
(74) *Attorney, Agent, or Firm* — Birch, Stewart, Kolasch & Birch, LLP

(57) ABSTRACT

A video display device drives LEDs to emit light by light source driving circuits, detects maximum signal levels for the respective colors from video signals for an amount of n screens (n is an integer equal to or larger than one), and calculates amplification factors for the respective colors based on the detected maximum signal levels. In addition, the video display device amplifies the signal levels of the video signals based on the amplification factors for the respective colors calculated in a power saving mode for reducing power consumption, and controls drive current values of the LEDs to be respectively supplied to the light source driving circuits so as to cancel amplification amounts of brightnesses of the LEDs that correspond to amplification amounts of the signal levels of the video signals amplified.

4 Claims, 5 Drawing Sheets

F I G. 2
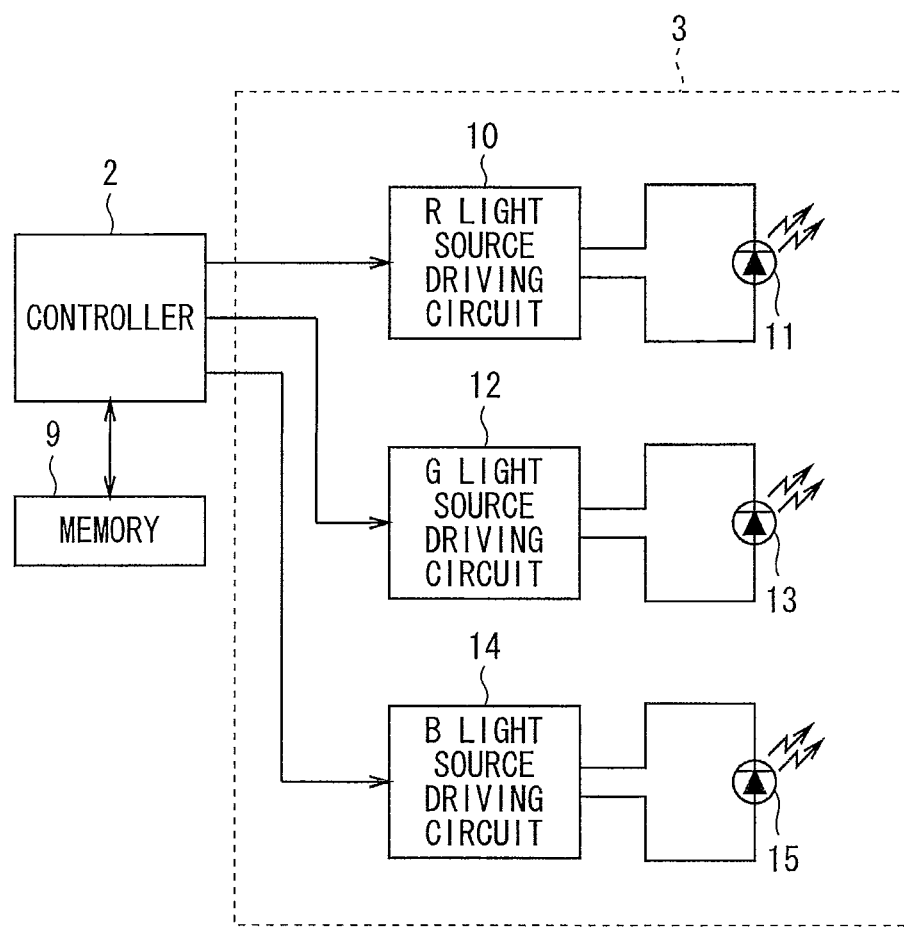

F I G. 4 A
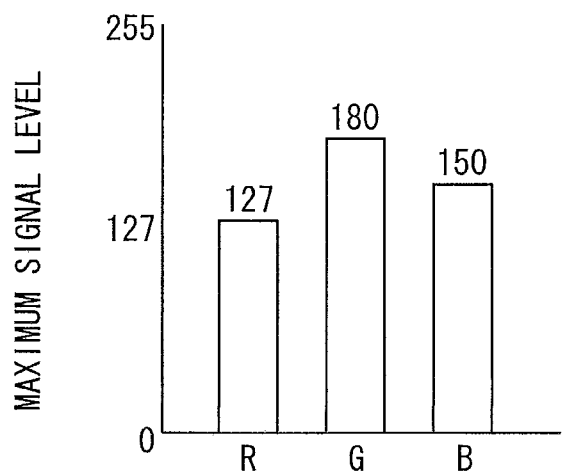
F I G. 4 B
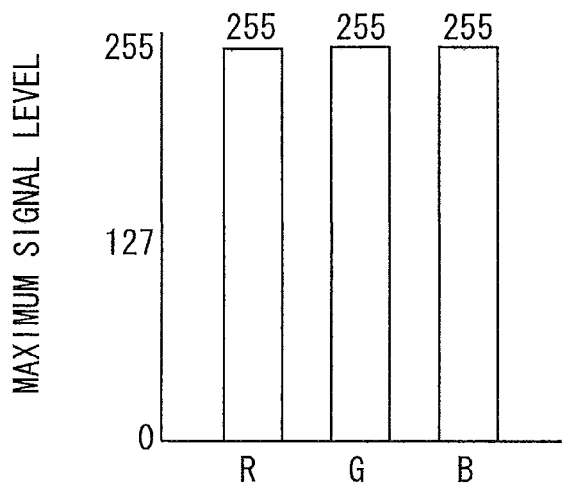

VIDEO DISPLAY DEVICE AND MULTI-SCREEN DISPLAY DEVICE

BACKGROUND OF THE INVENTION

1. Field of the Invention

The present invention relates to a video display device and a multi-screen display device formed through the combination of a plurality of video display devices, and more particularly, to a reduction in power consumption.

2. Description of the Background Art

A multi-screen display device obtained by arranging screens of a plurality of projection type video display devices is known as a display device that displays a large video image. While discharge lamps have been widely used as light sources in a projection type video display device, the progress of technology allows the output brightness of a light emitting diode (LED) to fit for use as a light source of a projection type video display device, and thus, LEDs are used these days (for example, see Japanese Patent Application Laid-Open No. 2005-274884).

The output brightness of an LED light source fits for use as a light source of a projection type video display device but, on the other hand, power consumption thereof becomes equal to or more than that of a discharge lamp. Similarly, an increase in power consumption is a problem also in a multi-screen display device formed through the combination of a plurality of projection type video display devices including LED light sources.

The multi-screen display devices are mainly used in monitoring rooms for roads, traffic, plants, and the like in many cases. In those cases, a portion that is not always required for display may exist in the multi-screen display device depending on the time period and display contents. Therefore, the method of turning off a part of power sources for projection type video display devices constituting a multi-screen display device is proposed as the method of reducing power consumption. In this method, however, a video image may not appear instantaneously as required, and the work of an operator may be hindered.

SUMMARY OF THE INVENTION

An object of the present invention is to provide the technology capable of reducing power consumption in a video display device and a multi-screen display device.

A video display device according to the present invention modulates, based on video signals, the intensity of the light emitted from LED light sources of predetermined colors and projects the light onto a screen. The video display device includes a light source driving section that drives the LED light sources to emit light, a detection section that detects maximum signal levels for the respective colors from the video signals for an amount of n screens (n is an integer equal to or larger than one), a calculation section that calculates amplification factors for the respective colors based on the maximum signal levels detected by the detection section, an amplification section that amplifies signal levels of the video signals based on the amplification factors for the respective colors calculated by the calculation section in a power saving mode for reducing power consumption, and a control section that controls drive current values of the LED light sources supplied to the light source driving section so as to cancel amplification amounts of the brightnesses of the respective LED light sources, the amplification amounts corresponding to amplification amounts of the signal levels of the video signals amplified by the amplification section.

According to the video display device of the present invention, in the power saving mode, the amplification section amplifies the signal levels of the video signals based on the amplification factors for the respective colors and the control section controls the drive current values of the respective LED light sources so as to cancel the amplification amounts of brightnesses of the LED light sources corresponding to the amplification amounts of signal levels of the video signals. Therefore, the drive current values of the LED light sources can be reduced without reducing the maximum brightness of the video display device. This enables to reduce power consumption in the video display device.

A multi-screen display device according to the present invention is formed through the combination of a plurality of the video display devices. The plurality of video display devices include one master device and slave devices. In the power saving mode, the slave devices transmit the amplification factors for the respective colors to the master device, and the master device extracts the smallest amplification factors for the respective colors from the amplification factors transmitted from the slave devices and transmits the smallest amplification factors to the slave devices.

According to the multi-screen display device of the present invention, the slave devices transmit the amplification factors for the respective colors to the master device, and the master device extracts the smallest amplification factors for the respective colors from the amplification factors transmitted from the slave devices and transmits the smallest amplification factors to the slave devices. Therefore, the drive current values of the LED light sources can be reduced in individual video display devices constituting the multi-screen display device, and the brightnesses of all the video display devices can be kept uniform. This enables to reduce power consumption in the multi-screen display device.

These and other objects, features, aspects, and advantages of the present invention will become more apparent from the following detailed description of the present invention when taken in conjunction with the accompanying drawings.

BRIEF DESCRIPTION OF THE DRAWINGS

FIG. 2 is a schematic configuration diagram of a light source circuit;

FIGS. 4A and 4B show examples of the conversion of video signal levels.

DESCRIPTION OF THE PREFERRED EMBODIMENTS

First Preferred Embodiment

Figure 1:
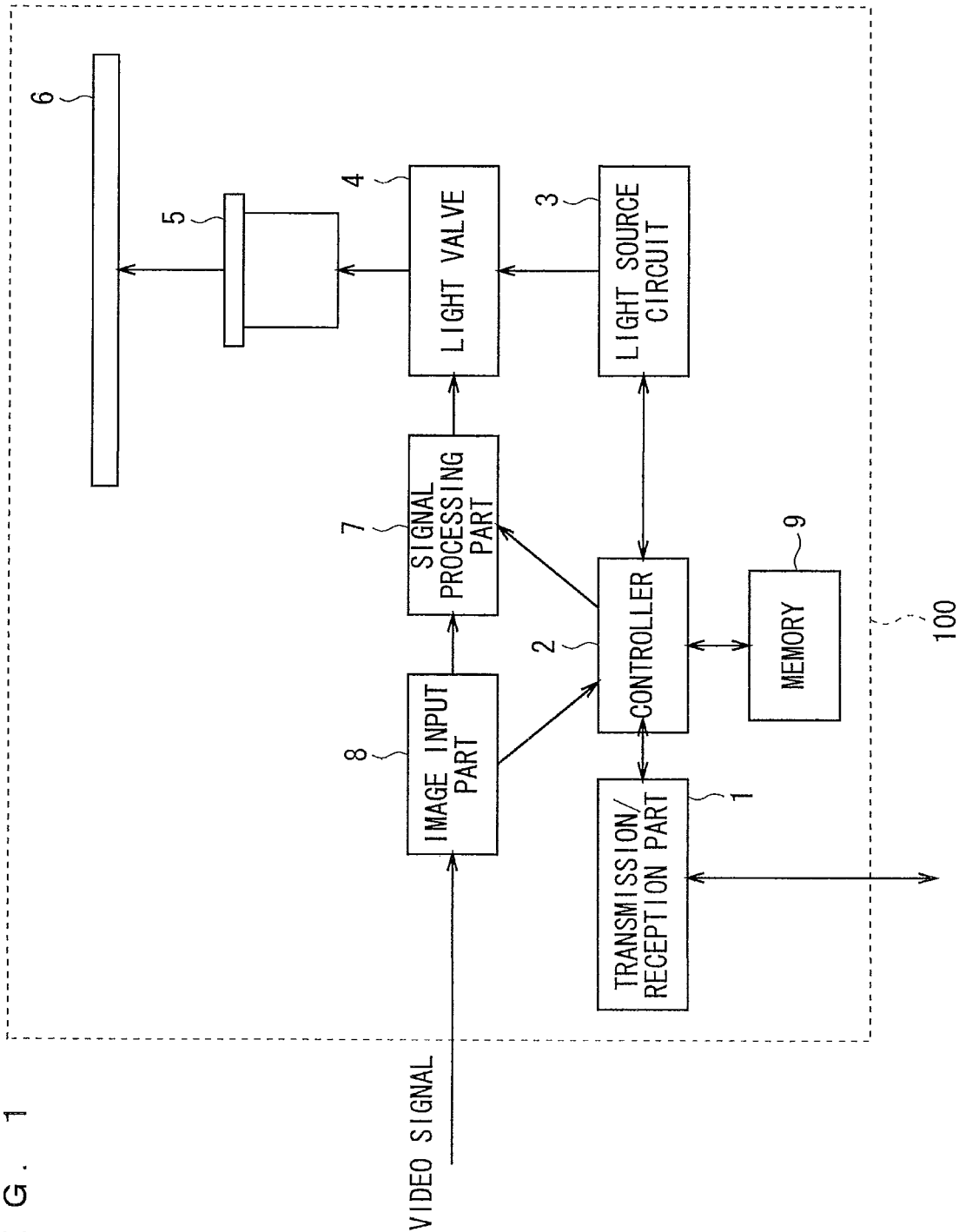
FIG. 1 is a schematic configuration diagram of a video display device according to a first preferred embodiment.

A first preferred embodiment of the present invention is described with reference to the drawings. FIG. 1 is a schematic configuration diagram of a video display device 100 according to the first preferred embodiment of the present invention. The video display device 100 includes a transmission/reception part 1, a controller 2, a light source circuit 3, a light valve 4, a projection lens 5, a screen 6, a signal processing part 7, an image input part 8, and a memory 9.

The light source circuit 3 includes, for example, LEDs as a light source, and an optical output of the light source circuit 3 is input to the light valve 4. Meanwhile, a video signal is input to the image input part 8 from the outside, and the image input part 8 outputs the video signal to the signal processing part 7. The signal processing part 7 performs signal processes such as the conversion (amplification) of a signal level of a video signal and scale-up and scale-down of a video signal, converts the video signal into a drive signal for driving the light valve 4, and then outputs the drive signal to the light valve 4. The light valve 4 modulates the intensity of the light output from the light source circuit 3 and outputs the light to the projection lens 5 at a timing of the drive signal, whereby a video image is projected onto the screen 6.

The transmission/reception part 1 is connected with, for example, an external PC and another video display device, and delivers instructions from the external PC and another video display device to the controller 2. The controller 2 receives the instructions from the external PC and another video display device, and switches between a normal mode and a power saving mode for reducing power consumption to control the respective parts. The operations of the respective parts in the normal mode and power saving mode are described below.

Details of the light source circuit 3 and the operation of the controller 2 in each mode are described with reference to FIG. 2. FIG. 2 is a schematic configuration diagram of the light source circuit 3. The light source circuit 3 includes an R light source LED 11 emitting red (R) light, an R light source driving circuit 10, a G light source LED 13 emitting green (G) light, a G light source driving circuit 12, a B light source LED 15 emitting blue (B) light, and a B light source driving circuit 14. The R light source LED 11 turns on when a drive current value thereof is controlled by the R light source driving circuit 10 by pulse driving. Similarly, the G light source LED 13 turns on when a drive current value thereof is controlled by the G light source driving circuit 12 by pulse driving, and the B light source LED 15 turns on when a drive current value thereof is controlled by the B light source driving circuit 14 by pulse driving.

The memory 9 stores the information indicating LED drive current value—output brightness value characteristics (see FIGS. 3A, 3B, and 3C), which has been obtained by, for example, the measurement of output brightness values with respect to drive current values of the R, G, and B light source LEDs 11, 13, and 15 in a manufacturing process. The controller 2 controls the drive current values of the R, G, and B light source LEDs 11, 13, and 15 to be supplied to the R, G, and B light source driving circuits 10, 12, and 14 (light source driving section) based on the information indicating the LED drive current value—output brightness value characteristics stored in the memory 9, to thereby adjust the brightnesses of the R, G, and B light source LEDs 11, 13, and 15.

In the normal mode, the controller 2 controls the signal processing part 7 not to convert the level of a video signal to be input to the image input part 8 and causes the memory 9 to store current values IR0, IG0, and IB0 to be output from the R, G, and B light source driving circuits 10, 12, and 14.

Meanwhile, in the power saving mode, the controller 2 controls the signal processing part 7 to convert the level of a video signal to be input to the image input part 8 such that the dynamic range of a signal output is maximized. At the same time, the controller 2 controls the drive current values of the R, G, and B light source LEDs 11, 13, and 15 based on the information indicating the LED drive current value—output brightness value characteristics stored in the memory 9 in accordance with the signal level detected by the image input part 8, to thereby adjust the brightnesses of the R, G, and B light source LEDs 11, 13, and 15 so as to reduce the brightness for an amount of dynamic range extended by the signal processing part 7.

Figure 3A:
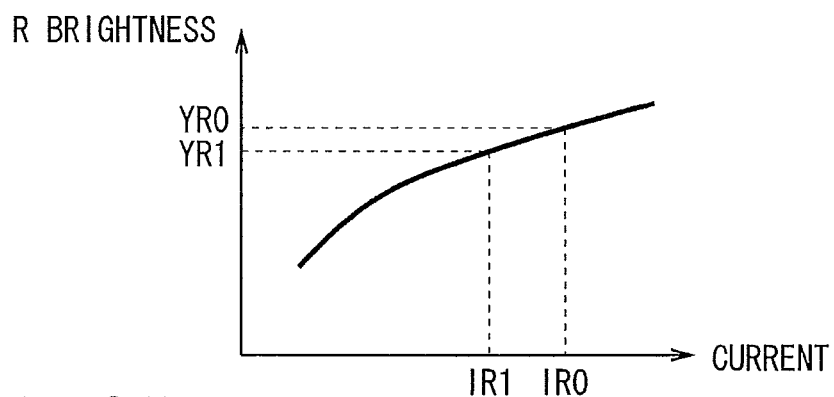
FIGS. 3A, 3B, and 3C show examples of LED drive current value—output brightness value characteristics.
Figure 3B:
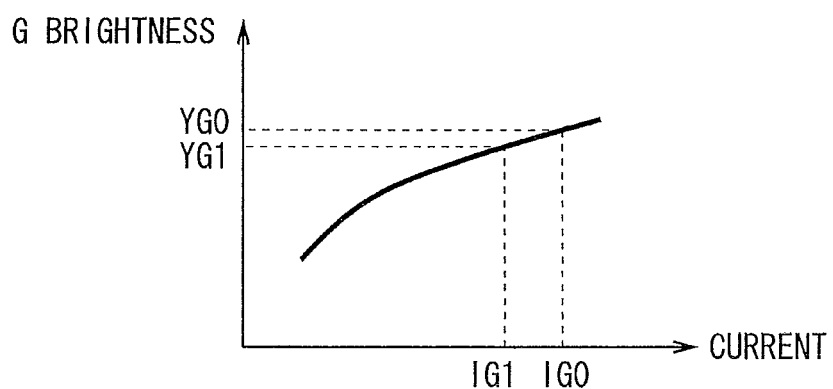
Figure 3C:
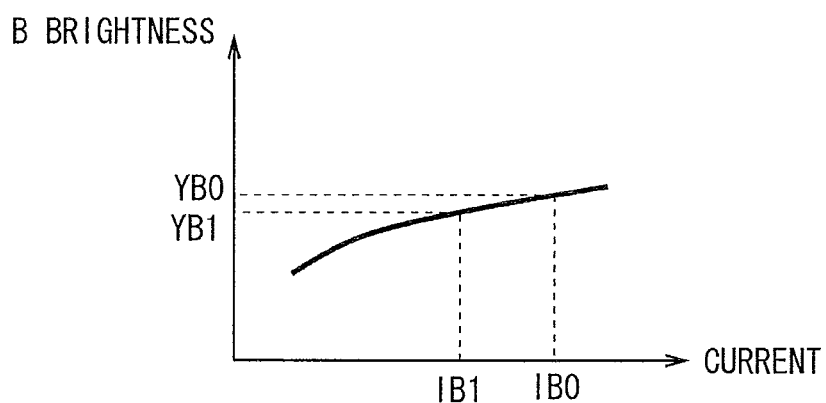

A specific control example is described with reference to FIGS. 3A, 3B, 3C, and 4. FIG. 3A shows an example of the LED drive current value—output brightness value characteristics of the R light source LED 11, FIG. 3B shows an example of the LED drive current value—output brightness value characteristics of the G light source LED 13, and FIG. 3C shows an example of the LED drive current value—output brightness value characteristics of the B light source LED 15.

In the power saving mode, the image input part 8 detects a signal level of a video signal. The image input part 8 detects a maximum signal level in a screen per screen of a video signal and per color of R, G, and B, and outputs the detected maximum signal level to the controller 2. The controller 2 holds the maximum signal levels for an amount of n screens (n is an integer equal to or larger than one) per color of R, G, and B, and extracts (detects) the largest value from the held maximum signal levels per color of R, G, and B. The image input part 8 and the controller 2 correspond to a detection section.

Further, the controller 2 calculates, based on the extracted maximum signal levels for an amount of n screens, a conversion factor (amplification factor) for converting the signal level of each color of R, G, and B into a signal level that can be used to full dynamic range, and outputs the conversion factor to the signal processing part 7. The signal processing part 7 corrects the signal level (amplifies the amplitude) uniformly over the entire screen, with the conversion factor. At the same time, in order to cancel an amplification amount of the brightness of each of the LEDs 11, 13, and 15 that corresponds to the amplification amount of the signal level amplified through the level conversion with the conversion factor, the controller 2 controls the light source circuit 3 to reduce a drive current value for each of the LEDs 11, 13, and 15 based on the information indicating the LED drive current value—brightness value characteristics stored in the memory 9. The controller 2 corresponds to a calculation section and a control section, and the signal processing part 7 corresponds to an amplification section.

FIG. 4A shows an example of a maximum signal level for an amount of n screens of each video signal level of R, G, and B to be input to the image input part 8, and FIG. 4B shows an example of a maximum signal level after the conversion of an amplification level of a signal to full dynamic range through the process by the controller 2. As an example, here, a minimum value and a maximum value of the signal level are 0 and 255, respectively.

As shown in FIG. 4A, the maximum values of the video signal levels detected by the controller 2 are 127, 180, and 150 for R, G, and B, respectively. Therefore, the signal processing part 7 performs a process to uniformly amplify the video signal level such that the maximum signal level of each color reaches 255. In this case, the maximum signal level within one screen is 127 in the signal of R, and thus, a conversion factor Cr is as follows.

$$Cr=(255+1)/(127+1)=2.000$$

Similarly, conversion factors Cg and Cb of G and B are as follows.

$$Cg=(255+1)/(180+1)=1.414$$

$$Cb=(255+1)/(150+1)=1.695$$

The signal processing part 7 converts and outputs, with the use of the conversion factors, video signals Rin, Gin, and Bin output from the image input part 8 as follows.

$$Rout = Cr \cdot Rin$$

$$Gout = Cg \cdot Gin$$

$$Bout = Cb \cdot Bin$$

For example, as to a portion whose signal level of R is 80 within the same screen, the signal processing part 7 converts a video signal as follows.

$$(80+1) \cdot (2.000) - 1 = 161$$

Meanwhile, in the examples shown FIGS. 3A, 3B, and 3C, the LED drive current values of R, G, and B in the normal mode are set to IR0, IG0, and IB0, respectively. The signal processing part 7 converts the signal levels of R, G, and B. Accordingly, if the brightness values corresponding to the drive current values on this occasion are YR0, YG0, and YB0, it suffices that the signal processing part 7 controls the LED drive current values of the R, G, and B light source LEDs 11, 13, and 15 so as to convert the brightness values of the R, G, and B light source LEDs 11, 13, and 15, respectively, as follows.

$$YR1 = YR0/Cr = YR0/2.00$$

$$YG1 = YG0/Cg = YG0/1.414$$

$$YB1 = YB0/Cb = YB0/1.695$$

That is, in the case of the R light source LED 11, a drive current value IR1 for allowing the R light source LED 11 to have a brightness value YR1 is obtained from the information indicating the LED drive current value—brightness value characteristics of the R light source LED 11 (see FIG. 3A) stored in the memory 9. Similarly, a drive current value IG1 for allowing the G light source LED 13 to have a brightness value YG1 is obtained from the information indicating the LED drive current value—brightness value characteristics of the G light source LED 13 (see FIG. 3B), and a drive current value IB1 for allowing the B light source LED 15 to have a brightness value YB1 is obtained from the information indicating the LED drive current value—brightness value characteristics of the B light source LED 15 (see FIG. 3C).

The controller 2 controls the drive current value of the R light source driving circuit 10, the drive current value of the G light source driving circuit 12, and the drive current value of the B light source driving circuit 14 in the light source circuit 3 to IR1, IG1, and IB1, respectively, to thereby control the brightnesses of the R, G, and B light source LEDs 11, 13, and 15 to YR1, YG1, and YB1, respectively.

After the above-mentioned process, the maximum signal levels of R, G, and B reach the maximum value 255 as shown in FIG. 4B. That is, the signal processing part 7 converts the dynamic range of a video signal to be input for each of R, G, and B, and as to the brightness amount converted and amplified by the signal processing part 7, reduces the brightnesses by controlling the drive current values of the R, G, and B light source LEDs 11, 13, and 15. This enables to reduce, even in the power saving mode, the drive current values of the R, G, and B light source LEDs 11, 13, and 15 while keeping the maximum brightness in the normal mode, leading to a reduction in power consumption.

In the video display device 100 according to this preferred embodiment, in the power saving mode, the signal processing part 7 converts the signal levels of the video signals based on the conversion factors of the respective colors, and the controller 2 controls the drive current values of the LEDs 11, 13, and 15 so as to cancel the amplification amounts of the brightnesses of the LEDs 11, 13, and 15 that correspond to the amplification amount of the signal level of the video signal. Accordingly, the drive current values of the R, G, and B light source LEDs 11, 13, and 15 can be reduced without reducing the maximum brightness of the video display device 100. This enables to reduce power consumption in the video display device 100. In other words, an energy consumption amount can be reduced in the video display device 100.

While the maximum signal levels for an amount of n screens are detected for each color of R, G, and B to be input to the image input part 8 and the signal processing part 7 and the light source circuit 3 are controlled based on the detected maximum signal levels in this preferred embodiment, in many cases, almost no change is found in video images displayed in the power saving mode. Therefore, only the maximum signal levels for an amount of the first n screens that are detected in the power saving mode may be detected and the conversion factor of the signal processing part 7 and the drive current value of the light source circuit 3 may be determined based on the detected maximum signal levels. In the power saving mode, the conversion factor and the drive current value may remain fixed over time. In this case, a maximum value detection circuit (not shown) of the image input part 8 can be stopped, leading to further power consumption.

While the signal processing part 7 individually adjusts the dynamic ranges of R, G, and B with the maximum signal levels of the respective colors of R, G, and B to be input to the image input part 8 in this preferred embodiment, a conversion factor may be calculated with the largest value among the maximum values of R, G, and B to be detected by the image input part 8. For example, in the case of FIG. 4A, G (180) having the largest dynamic range is selected, where the conversion factors Cr, Cg, and Cb are as follows.

$$Cr = Cg = Cb = (255+1)/(180+1) = 1.414$$

In this case, it suffices that the drive current values of the R, G, and B light source LEDs 11, 13, and 15 are controlled for the conversion as follows.

$$YR1 = YR0/Cg = YR0/1.414$$

$$YG1 = YG0/Cg = YG0/1.414$$

$$YB1 = YB0/Cg = YB0/1.414$$

In this case, the conversion factor common to all of the predetermined colors is used in place of the conversion factors for the respective colors of R, G, and B, which allows the color resolutions of R, G, and B in the power saving mode to be identical to each other.

Second Preferred Embodiment

Figure 5:
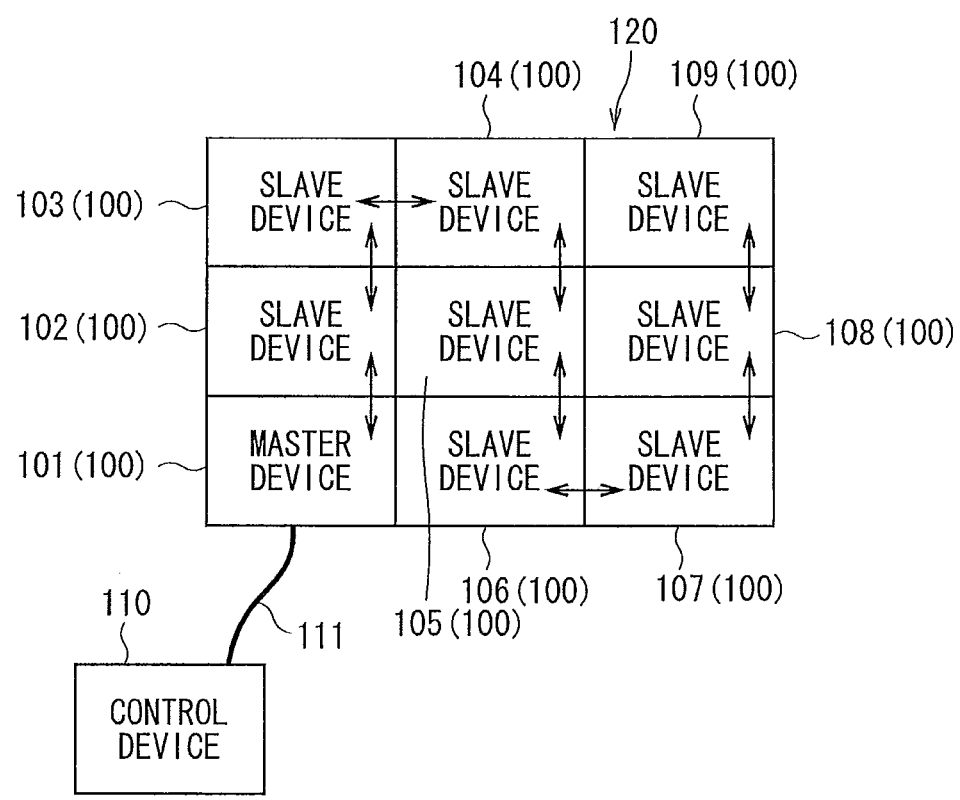
FIG. 5 is a schematic configuration diagram of a multi-screen display device according to a second preferred embodiment.

Next, a multi-screen display device 120 according to a second preferred embodiment is described. FIG. 5 is a schematic configuration diagram of the multi-screen display device 120. In the second preferred embodiment, similar components to those described in the first preferred embodiment are denoted by like references, which are not described here. The multi-screen display device 120 is configured to have a larger display screen (large screen) through the combination of a plurality of video display devices 100. The multi-screen display device 120 is composed by arranging, for example, three rows and three columns of video display devices 100.

The video display devices 100 include a master video display device 101 and other slave video display devices 102 to 109. The master video display device 101 and the slave video display devices 102 to 109 have approximately the same configuration. In the following description, the master video display device 101 and the slave video display devices 102 to 109 are referred to as "master device 101" and "slave devices 102 to 109", respectively. As indicated by arrows in FIG. 5, the master device 101 and the slave devices 102 to 109 are bidirectionally connected to each other by means of communication cables.

Each of the master device 101 and the slave devices 102 to 109 independently exerts a function as the video display device 100, which enables to minimize the power consumption of the entire multi-screen display device 120.

In the master device 101 and the slave devices 102 to 109, through a similar procedure to that of the first preferred embodiment, the maximum signal levels of R, G, and B are detected per screen for video signals to be input to the image input part 8, and the conversion factors for converting the signal levels of R, G, and B to signal levels enabling use to full dynamic range are calculated.

The slave devices 102 to 109 each transmit conversion factors to the master device 101. The master device 101 obtains the conversion factors of R, G, and B of all the video display devices 100 constituting the multi-screen display device 120, and extracts the smallest conversion factors for the respective colors of R, G, and B. The master device 101 transmits the extracted smallest conversion factors for the video signals of R, G, and B to the slave devices 102 to 109.

As in the first preferred embodiment, each video display device 100 converts the signal level and controls the LED drive current value for each color of R, G, and B and for each of the screens, with the use of the received smallest conversion factors for the received video signals of R, G, and B.

Through the above-mentioned procedure, the video display devices 100 constituting the multi-screen display device 120 all control the dynamic range of the video signal level and controls the LED drive current value for each color of R, G, and B, to thereby reduce the LED drive current values of the respective video display devices 100 and keep the brightness of the entire multi screen uniform. This enables to reduce power consumption in the multi-screen display device 120 without degradation in image quality. In other words, the multi-screen display device 120 can reduce an energy consumption amount.

While the dynamic range is controlled and the LED drive current value is controlled for each color of R, G, and B in this preferred embodiment, the dynamic ranges of R, G, and B and the LED drive current values thereof may be controlled for the respective video display devices 100, with the smallest conversion factor among the conversion factors of all the video display devices 100 constituting the multi-screen display device 120. In this case, a conversion factor common to all of the colors of R, G, and B of the video display devices 100 is used. Accordingly, the color resolutions of R, G, and B of the entire multi-screen display device 120 in the power saving mode can be made identical to each other, which does not cause the degradation in connection between the intermediate colors.

In the multi-screen display device 120, the master device 101 may cause a shift to the power saving mode based on any one of a keyboard operation and a motion of an image on a plurality of video display devices. A PC 110 (hereinafter, referred to as "control device 110") that controls the multi-screen display device 120 is connected with the master device 101 by means of a connection cable 111 (for example, LAN cable or RS232C cable). Instructions from the control device 110 are transmitted to the slave devices 102 to 109, that is, all the video display devices 100 constituting the multi-screen display device 120, via the master device 101. The control device 110 instructs the slave devices 102 to 109 to shift to the power saving mode via the master device 101.

The instruction may be made to allow control per hour or per day by, for example, a preset schedule function. Alternatively, the instruction may be made to allow automatic control depending on the presence or absence of access (such as a mouse operation or a keyboard operation in a PC) to the entire system for a certain period of time. Still alternatively, a motion detecting function of a monitoring camera may be used, or human detection with an infrared camera located in the vicinity of the multi-screen display device 120 may be used.

As described above, the LED drive current values are intricately controlled to meet the image quality level demanded in various situations per scene or per time, which enables to constantly operate the entire system with appropriate consumption power. Therefore, integral power consumption can be minimized While the invention has been shown and described in detail, the foregoing description is in all aspects illustrative and not restrictive. It is therefore understood that numerous modifications and variations can be devised without departing from the scope of the invention.

What is claimed is:

1. A video display device that modulates, based on video signals, the intensity of the light emitted from LED light sources of predetermined colors and projects the light onto a screen, the video display device comprising:
   a light source driving section that drives said LED light sources to emit light;
   a detection section that detects maximum signal levels for the respective colors from said video signals for an amount of n screens (n is an integer equal to or larger than one);
   a calculation section that calculates amplification factors for the respective colors based on said maximum signal levels detected by said detection section;
   an amplification section that amplifies signal levels of said video signals based on the amplification factors for the respective colors calculated by said calculation section in a power saving mode for reducing power consumption; and
   a control section that controls drive current values of said LED light sources supplied to said light source driving section so as to cancel amplification amounts of the brightnesses of said respective LED light sources, the amplification amounts corresponding to amplification amounts of the signal levels of said video signals amplified by said amplification section,
   wherein said plurality of video display devices include one master device and slave devices, and in said power saving mode, said slave devices transmit the amplification factors for the respective colors to said master device, and said master device extracts the smallest amplification factors for the respective colors from the amplification factors of all the video display devices constituting said multi-screen display device and transmits the smallest amplification factors to said slave devices.

2. The video display device according to claim 1, wherein an amplification factor common to all of the predetermined colors is used in place of said amplification factors for the respective colors.

3. The video display device according to claim 1, wherein the amplification factors for the respective colors and the drive current values of said respective LED light sources remain fixed over time.

4. The multi-screen display device according to claim 1, wherein said master device causes a shift to said power saving mode based on any one of a set time, a keyboard operation, and a motion of an image on said plurality of video display devices.

* * * * *